(12) United States Patent
Williams et al.

(10) Patent No.: US 7,350,214 B2
(45) Date of Patent: Mar. 25, 2008

(54) PRINTER DRIVER INITIALIZATION

(75) Inventors: Brett Williams, Roseville, CA (US); John Reilly, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 700 days.

(21) Appl. No.: 10/640,494

(22) Filed: Aug. 13, 2003

(65) Prior Publication Data
US 2005/0036166 A1    Feb. 17, 2005

(51) Int. Cl.
G06F 9/54 (2006.01)
G06F 15/177 (2006.01)

(52) U.S. Cl. .................................. 719/317; 709/220

(58) Field of Classification Search .............. None
See application file for complete search history.

(56) References Cited

U.S. PATENT DOCUMENTS 6,023,585 A * 2/2000 Perlman et al. ............ 717/178
6,301,012 B1 * 10/2001 White et al. ............... 358/1.15
6,615,088 B1 * 9/2003 Myer et al. .................. 700/20
6,789,111 B1 * 9/2004 Brockway et al. .......... 709/222
6,842,766 B2 * 1/2005 Brockway et al. .......... 709/203
2002/0046266 A1 * 4/2002 Muralidhar et al. ........ 709/220
2004/0015959 A1 * 1/2004 Kobayashi ................. 717/174

OTHER PUBLICATIONS

Jeffrey A. Ferus, "Windows® 2000 Deployment & Desktop Management, System cloning", Apr. 12, 2001.*

* cited by examiner

*Primary Examiner*—William Thomson
*Assistant Examiner*—Abdou K Seye

(57) ABSTRACT

In one embodiment of the invention, a method for printer driver initialization for a non-Microsoft Windows system, includes: copying a selected printer driver from a remote system to a local system, and installing the printer driver on the local system; initializing the printer driver on the local system and generating initialization information for the initialized printer driver; cloning the initialization information, and storing the cloned initialization information on the remote system; and binding the cloned initialization information to the selected printer driver. The remote system may be a non-Microsoft Windows system. The local system may be a Microsoft Windows system.

20 Claims, 4 Drawing Sheets

PRINTER DRIVER INITIALIZATION

TECHNICAL FIELD

Embodiments of the present invention relate generally to network printing technology, and more particularly to printer Microsoft® Windows® driver initialization for non-Microsoft® Windows® systems.

BACKGROUND

Problems are present in techniques for remote printer driver initialization between one system that uses a printer driver and another system that vends, but does not use, the printer driver. Users are unable to store the printer driver in an environment that did not facilitate the normal printer driver initialization and operation.

As a specific example, printer drivers have standard entry points that are called into by a Microsoft Windows system to permit the print driver to perform its initialization process. However, when a user sets up a printer share intended to be used by Microsoft Windows clients on a machine that is non-Microsoft Windows, the driver cannot be initialized from that machine. This can result in failure of the printer driver when it is vended to the Microsoft Windows machine.

Therefore, the current technology is limited in its capabilities and suffers from at least the above constraints.

SUMMARY OF EMBODIMENTS OF THE INVENTION

In one embodiment of the invention, a method for printer driver initialization for a non-Microsoft Windows system, includes:

copying a selected printer driver from a remote system to a local system, and installing the printer driver on the local system;

initializing the printer driver on the local system and generating initialization information for the initialized printer driver;

cloning the initialization information, and storing the cloned initialization information on the remote system; and binding the cloned initialization information to the selected printer driver.

The remote system may be a non-Microsoft Windows system. The local system may be a Microsoft Windows system.

In another embodiment, an apparatus for printer driver initialization for a non-Microsoft Windows system, includes: a remote printer driver initialization code implemented in a client computer, the code configured to permit a copy a selected printer driver from a remote system to a local system, and install the printer driver on the local system; initialization of the printer driver on the local system and generation of the initialization information for the initialized printer driver; clone of the initialization information, and store of the cloned initialization information on the remote system; and bind of the cloned initialization information to the selected printer driver.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
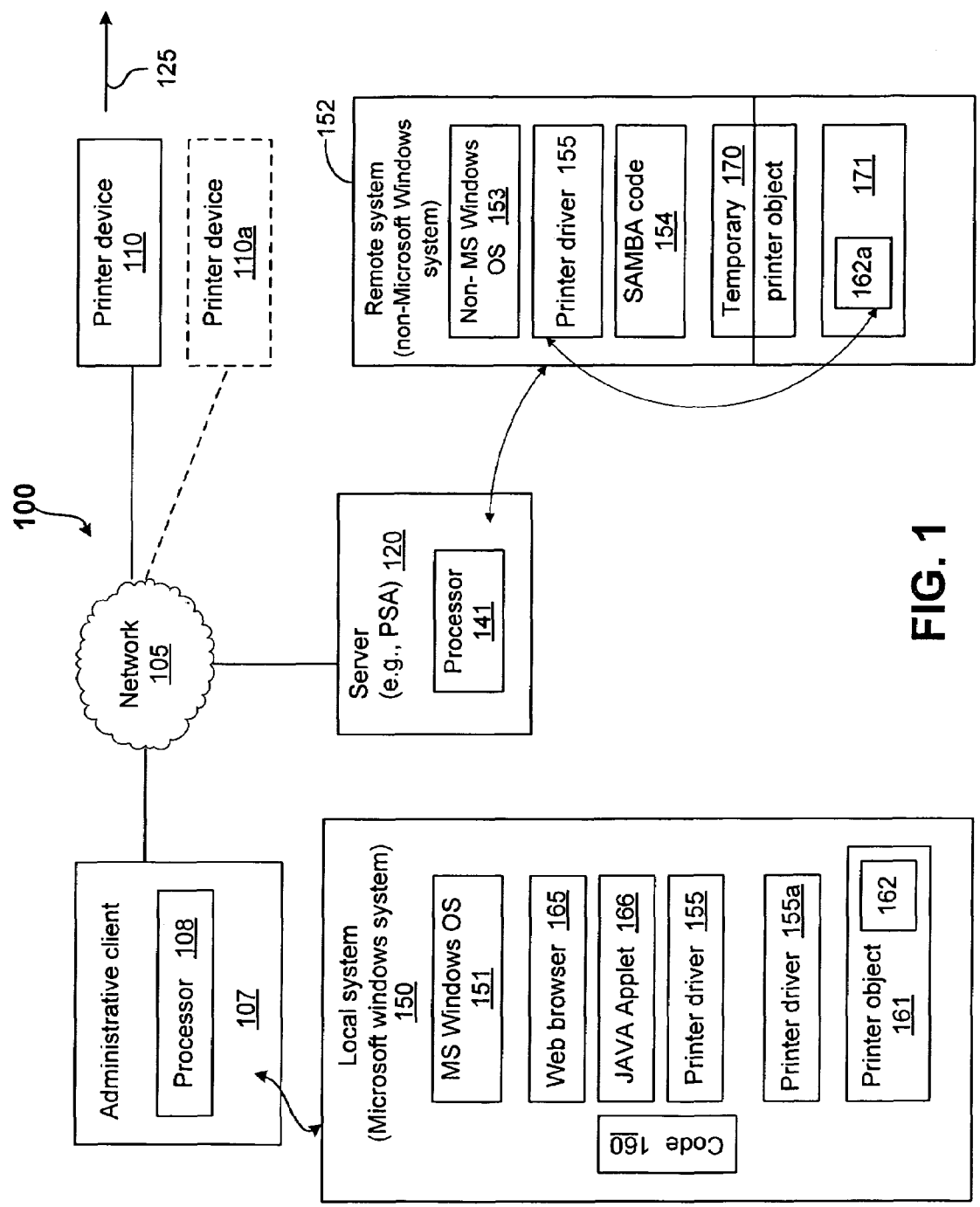
FIG. 1 is a block diagram of an apparatus (system) in accordance with an embodiment of the invention.

FIG. 1 is a block diagram of a network printing system 100 that can implement an embodiment of the invention. In the example network printing system 100, a network 105 permits communications between various devices that are coupled in the network 105.

In an embodiment, the network printing system 100 includes the following components: one or more administrative client computers 107, and one or more printer devices (e.g., printer device 110 in the example of FIG. 1). A server 120 is also included in the network printing system 100 to perform various functions as described below.

The network printing system 100 also typically includes other components that are known and are used for permitting functions in a communication network. For purposes of focusing on the embodiments of the invention, these other known components are not shown in FIG. 1.

In an embodiment, an administrative client computer 107 is typically a computer (e.g., personal computer) that supports the Microsoft Windows system 150 which is based upon a Microsoft Windows operating system (OS) 151 from MICROSOFT CORPORATION. The Microsoft Windows system 150 is also generally known as a Microsoft Windows platform 150. Those skilled in the art will recognize that an administrative client computer 107 may be any suitable type of computer such as, for example, a laptop, notebook, palmtop, server, workstation, mainframe, minicomputer, or other types of computing devices. The Windows OS 151 and other software or firmware in the administrative client computer 107 are executed by a processor 108 in the administrative client computer 107.

Various known components and modules that permit a user to use the administrative client computer 107 and to permit the administrative client computer 107 and PSA 120 to interface in the network 100 are not shown in FIG. 1 for purposes of describing a functionality of embodiments of the invention.

The physical printer device 110 may be a printer for generating a printed output 125 from a print job. Alternatively, the physical printer device 110 may be other types of devices, such as a copy machine, fax machine, or digital projector that can generate printed output 125 from a print job.

In an embodiment, a server 120 supports a non-Microsoft Windows system 152 which is based upon a non-Microsoft Windows operating system (OS) 153. The non-Microsoft Windows system 152 is also generally known as a non-Microsoft Windows platform 152. One example of the non-Microsoft Windows OS 153 is the Linux operating system. The server 120 includes a processor 141 to execute a non-Microsoft Windows operating system 153. The server 120 is typically implemented as a PSA (Print Server Appliance) 120 which is a device that replicates a portion of the Windows server environment that is responsible for printing functions. One example of a suitable PSA 120 is of the type available from HEWLETT-PACKARD COMPANY. However, other suitable types of hardware may be used to implement the server 120.

The PSA 120 runs the SAMBA opens source code 154 on top of the non-Microsoft Windows OS 153. SAMBA is an open source (freeware) implementation of the SMB (Server Message Block) file sharing protocol that provides file and print services to SMB/CIFS (Server Message Block/Common Internet File System) client computers. SAMBA emulates the Windows print environment, and allows a non-Windows server to communicate with the same networking protocol as the Windows products. It is noted that SAMBA can be installed on a variety of operating system platforms.

As discussed below, one or more printer drivers 155 is installed in the non-Microsoft Windows system 152 in the PSA 120, but are initialized in the Microsoft Windows system 150 in the administrative client computer 107. Printer drivers are typically implemented in code and are available from various vendors such as, for example, HEWLETT-PACKARD COMPANY. The initialization process for a printer driver 155 is described further below with reference to FIG. 2 and FIG. 3.

As known to those skilled in the art, a device driver is a program that controls a particular type of device that is attached to a computer. There are device drivers for printers, displays, CD-ROM readers, diskette drives, and other types of physical devices. A device driver essentially converts the more general input/output instructions of the operating system to messages that the physical device type can understand. It is also noted that in current techniques, a print driver is typically installed in a Windows system, and the Windows system performs a function call to standard entry points of the print driver so that the print driver can initialize itself.

An embodiment of the invention provides a remote printer driver initialization code (or remote printer driver initialization engine) 160 that runs in the Windows system platform and permits various functions as described below in FIGS. 2 and 3. One embodiment of the printer driver initialization code 160 is commercially available from HEWLETT-PACKARD COMPANY. The printer driver initialization code 160 permits the Windows system 150 to download a selected printer driver 155 from the non-Microsoft Windows system 153 in the PSA 120 to the Microsoft Windows system 150 in the administrative client computer 107, to create a printer object 161 for a printer device 110 that will use that printer driver 155, to permit the printer driver 155 to initialize itself in the Windows system 150 by use of standard Windows APIs (Application Program Interfaces), to obtain initialization information 162 from the printer object 161 that is associated with the initialized printer driver 155a in the Windows system 150, to send and store the initialization information 162 from the Windows system 150 in the administrative client computer 107 to the non-Microsoft Windows system 152 in the PSA 120, and to permit the binding of the initialization information 162 with the printer driver 155 so that the initialization information 162 is used when another printer object (associated with another physical printer device 110a) is subsequently created (where the physical printer device 110a will use the same printer driver 155), and to permit clean up steps in the administrative client computer 107 and the PSA 120.

Therefore, the printer driver initialization code 160 permits the initialization information 162 about the initialized printer driver 155a in the Windows system 150 to be cloned into the non-Microsoft Windows systems 152 for future use when another physical printer device 110a that will use the same initialized printer driver 155a is added to the network 105. This cloning process advantageously avoids repeating the process of creating the initialization information 162 in the Windows system 150 when another physical printer device 110a is added to the network 105.

It should be appreciated that, in alternative embodiments, the network printing system 100 may include components and products other than those discussed above. Moreover, the network printing system 100 can be implemented on different hardware. Printers having printing capabilities different from the disclosed physical printer devices may be used. Those skilled in the art will recognize that other alternative hardware and software environments may be used without departing from the scope of embodiments of the invention. As such, the exemplary environment in FIG. 1 is not intended to limit embodiments of the invention.

Figure 2A:
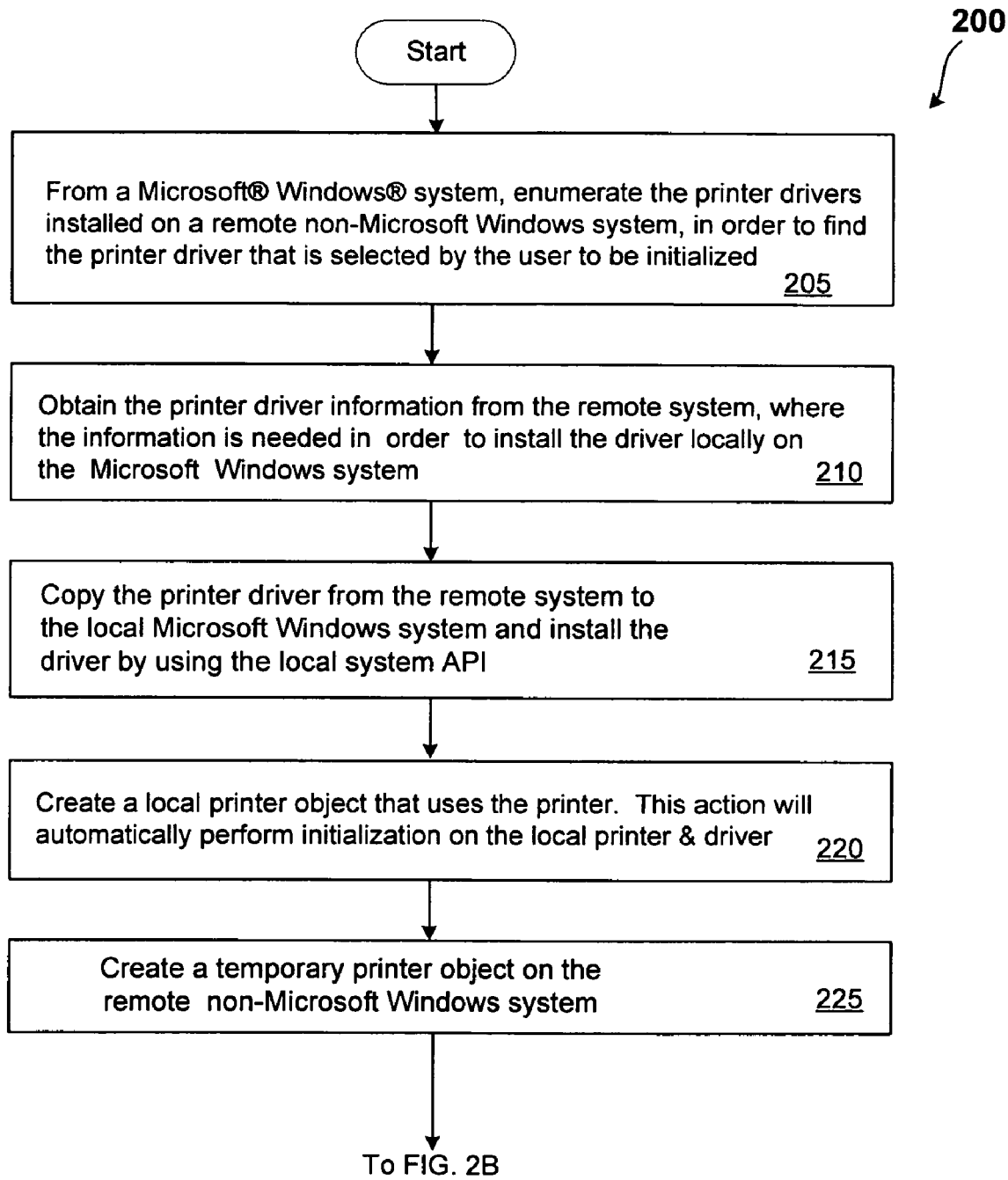
FIG. 2 is a flowchart of a method to initialize a printer driver for a non-Microsoft Windows system, where the printer driver is intended to run on a Microsoft Windows system, in accordance with an embodiment of the invention.
Figure 2B:
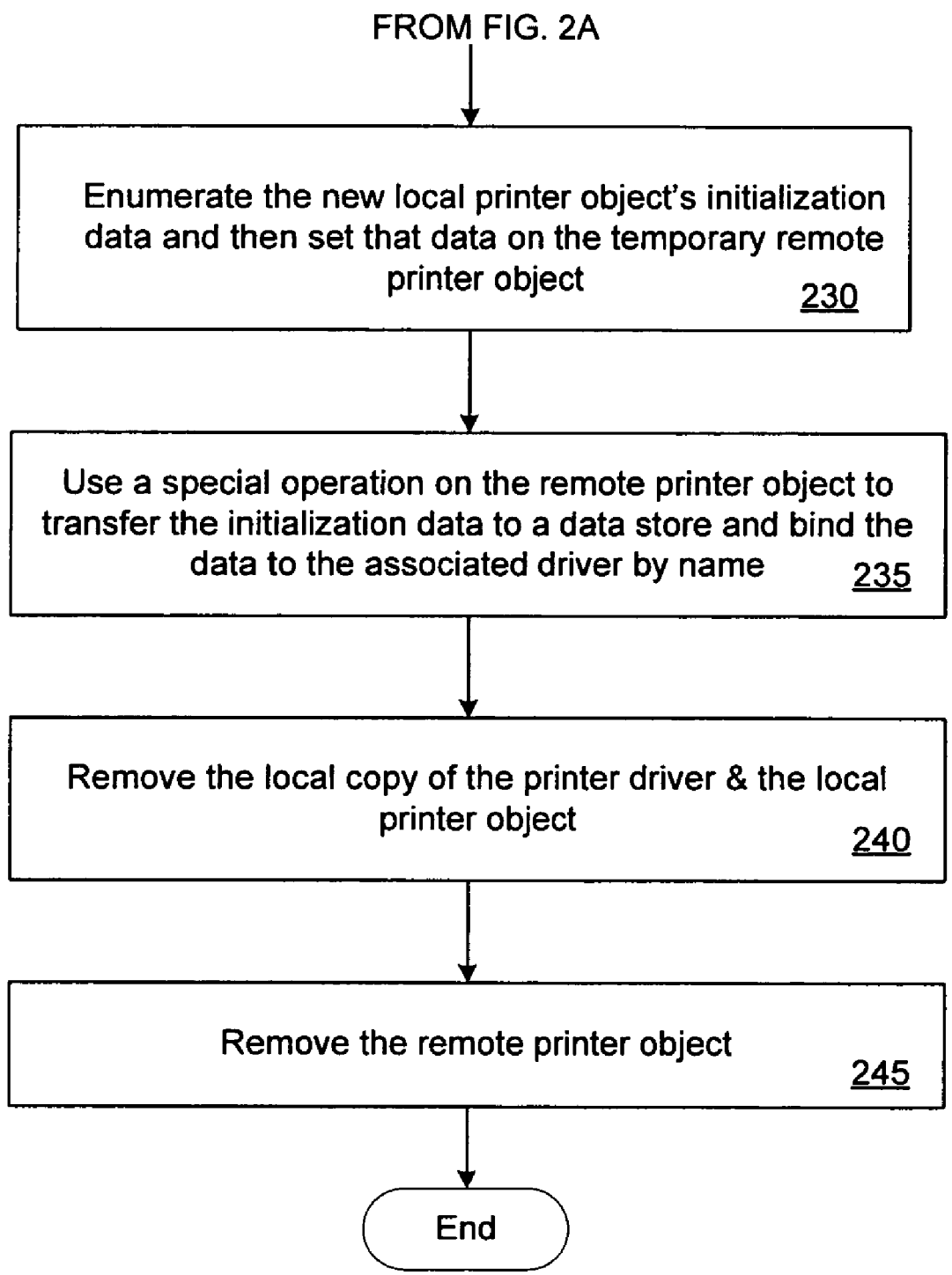

Reference is now made to both FIG. 1 and FIG. 2 to describe an example operation of an embodiment of the invention. FIG. 2 is a flowchart of a method 200 to initialize a printer driver 155 for a remote non-Microsoft Windows system 152, where the printer driver 155 is intended to run on a local Microsoft Windows operating system 150, in accordance with an embodiment of the invention. The method 200 begins with step (205), as discussed below. The code 160 (FIG. 1) permits the various steps in the method 200 to be performed.

However, it is noted that prior to step (205), one or more printer drivers 155 are installed in the non-Microsoft Windows system 152 in the PSA by a standard separate process. Prior to step (205), this printer driver(s) 155 in the PSA 120 is not yet initialized.

The PSA 120 is managed through web interaction. Therefore, the administrative client computer 107 can browse into the PSA 120 by use of, for example, a web browser 165, in the administrative client computer 107. A printer driver 155 in the non-Microsoft Windows system 152 in the PSA 120 can be installed into the Microsoft Windows system 150 in the administrative client computer 107 by use of commands from the web browser 165. Typically, to install a printer driver 155 from the PSA 120 to the administrative client computer 107, the web browser 165 fetches a JAVA applet 166 to run on the administrative client computer 107. The JAVA applet 166 then fetches a piece of code 160 (typically in C language) that is initialized and run on the administrative client computer 107. Once this piece of code 160 is running on the administrative client computer 107, then this printer driver initialization code 160 will permit steps (205) to (245) to be performed as described below, in accordance with an embodiment of the invention. This printer driver initialization code 160 typically runs in the Windows operating system platform 150.

In step (205), from the Microsoft Windows system 150 (i.e., "local system" 150) on the administrative client computer 107, the printer driver initialization code 160 then enumerates the printer driver(s) 155 that are installed on the non-Microsoft Windows system 152 (i.e., "remote system" 152) in the PSA 120. This enumeration permits the user to determine the particular printer driver(s) 155 that are installed in the non-Microsoft Windows system 152 and to find the printer driver 155 that is to be selected by the user for initialization. This enumeration of the printer drivers 155 involves a call by the Windows system 150 into the non-Microsoft Windows system 152 by use of a standard enumerate printer drivers API call. It is noted that since SAMBA emulates the Windows operating system, SAMBA can support most of the network accessible APIs. Therefore, the Windows system 150 can communicate with SAMBA as if the Windows system 150 is talking to another Windows-based server.

In step (210), the printer driver information of printer driver 155 is obtained from the remote non-Microsoft Windows system 152, and installed on the Microsoft Windows system 150 in the administrative client computer 107. This information of the selected printer driver 155 is needed in order to install the selected printer driver 155 locally on the Microsoft Windows system 150. This process of obtaining the printer driver information involves a call by the Windows OS 151 into the non-Microsoft Windows OS 153 by use of a standard API call.

The printer driver information typically includes multiple files that are required for use of the printer driver 155, including a file with the main entry point that is supported by the printer driver 155, the name of the driver, the version of the operating system for use with the printer driver, and other specific information about the printer driver 155.

In step (215), the selected printer driver 155 (including the printer driver information) are copied from the remote non-Microsoft Windows system 152 to the local Microsoft Windows system 150, and the selected printer driver 155 and associated printer driver information are installed in the Microsoft Windows system 150 by using a local system API call in the administrative client 107. Step (215) involves the Windows system 150 copying all files of the selected printer driver 155 into appropriate directory locations in the Windows OS 151

Step (220) involves creating a local printer object 161 that uses (and represents) a physical printer device 110. The local printer object 161 is data with various settings that describe the physical printer device 110. The local printer object 161 is created on the Microsoft Windows system 150 in the administrative client 107. When the local printer object 161 is created, the name of the printer driver 155 and other information is provided in an API call into the Microsoft Windows OS 151.

It is noted that a printer driver itself includes code that is responsible for initialization of the printer driver. The data associated with the initialization of the printer driver is stored into a local printer object. The local printer object is a data structure within the Windows registry and contains information that the printer driver generated during its initialization steps.

In step (220), when the local printer object 161 is created, the Windows OS 151 will send an API call that will permit the printer driver 155 to automatically perform its initialization steps. The initialization data 162 is stored into the local printer object 161. The printer driver 155 will initialize itself by using standard Windows tools. In particular, the printer driver 155 will initialize itself by use of the standard Windows APIs. The un-initialized printer driver 155 in the administrative client computer 107 is transformed into the initialized printer driver 155a.

In step (225), a remote temporary printer object 170 is created on the remote non-Microsoft Windows system 152 in the PSA 120. This temporary printer object 170 is created by use of standard Windows APIs calls from the Windows OS 151 in the administrative client computer 107 to the non-Microsoft Windows OS 153 in the PSA 120.

Step (230) involves enumerating the initialization information 162 of the newly-created local printer object 161 in the administrative client computer 107. In step (230), as the initialization information 162 is enumerated by the printer driver initialization code 160, the code 160 also clones the initialization information 162 to the temporary printer object 170 on the non-Microsoft Windows system 152. This cloned initialization information 162a is set on the temporary printer object 170 by using standard API calls across the network 105 from the Windows OS 151 to the non-Microsoft Windows OS 153. Thus, step (230) performs the function of cloning of all data that represents the initialized printer driver 155a on the Windows system 150 and setting the cloned data 162a on the temporary printer object 170 in the non-Microsoft Windows system 152 in the PSA 120. This cloned initialization information 162a will contain a snapshot of data associated with the physical printer device 110 after the physical printer device 110 was initialized. This cloned initialization information 162a effectively permits the printer driver 155 to be installed on the PSA 120 and to be effectively initialized on the PSA 120. Therefore, if another printer device 110a is to be added, the entire initialization process of creating the initialization information 162 is not again performed in the administrative client computer 107 because the cloned initialization data 162a is available for use by the newly-added printer device 110a. This initialization information 162a can be cloned again for the new printer device to be added.

In step (235), the cloned initialization information 162 is bound with the printer driver 155 itself, instead of being bound with the physical printer device 110. Therefore, when the non-Microsoft Windows system 152 adds another physical printer device 110a that will use the same printer driver 155, the non-Microsoft Windows system 152 will use the same cloned initialization information 152 for the newly-added physical printer device 110a, instead of having to perform an initialization in the administrative client computer 107 to generate an initialization information for the newly-added physical printer device 110a.

In step (235), a special operation is used on the temporary printer object 170 to transfer the cloned initialization information 162a from the remote temporary printer object 170 to a data store 171, and to bind this cloned initialization information 162a to the printer driver 155 by name of the printer driver 155. Therefore, the special operation triggers the non-Microsoft Windows system 152 to associate a copy of the cloned initialization information 162a with the printer driver 155. The cloned initialization information 162a is bound to printer driver 155 by use of standard techniques in binding all relevant driver data to the printer driver 155.

By binding the cloned initialization information 162a to the particular printer driver 155, each time that the particular printer driver 155 is referenced by name in the future, all files associated with that particular printer driver 155 (including the cloned initialization information 162*a*) will be obtained and accordingly processed. Therefore, in the future, if a network administrator were to create another printer object that is targeted at a new physical printer device 110*a* that will use the same printer driver 155, the network administrator can just select the printer driver 155 and will have the cloned initialization information 162*a* immediately available for processing and use for the newly-created printer object and newly-added physical printer 110*a*.

In essence, the step of creating the cloned initialization information 162*a* involves reading the settings on the local printer object 161 in the Windows system 150 and writing these settings to the temporary printer object 170 in the non-Microsoft Windows system 152. The cloned initialization information 162*a* is then written into the data store 171. Preferably, the temporary printer object 170 has a unique name that is highly unlikely to be used as a printer object name for a physical printer.

In step (240), the local copy 155*a* of the printer driver 155 and the local printer object 161 in the administrative client computer 107 are removed by the Windows OS 150, in order to clean up the administrative client computer 107 and increase the available memory space.

In step (245), the remote temporary printer object 170 in the PSA 120 is removed by the non-Microsoft Windows OS 153, in order to clean up the PSA 120 and increase the available memory space. The code 160 permits the process that calls a remote function to delete the temporary information (i.e., an API call permits the non-Microsoft Windows OS 153 to remove the temporary object 170).

An example of the above method 200 may include Windows-based printer drivers that are stored on a SAMBA/Linux based machine (server). The printer drivers could be vended with Microsoft's Point and Print method, using standard Windows APIs that are supported by the SAMBA server. A print driver would be initialized on a Windows-based computer (e.g., an administrative personal computer), and the initialization information is then cloned into and vended from the SAMBA server.

Figure 3:
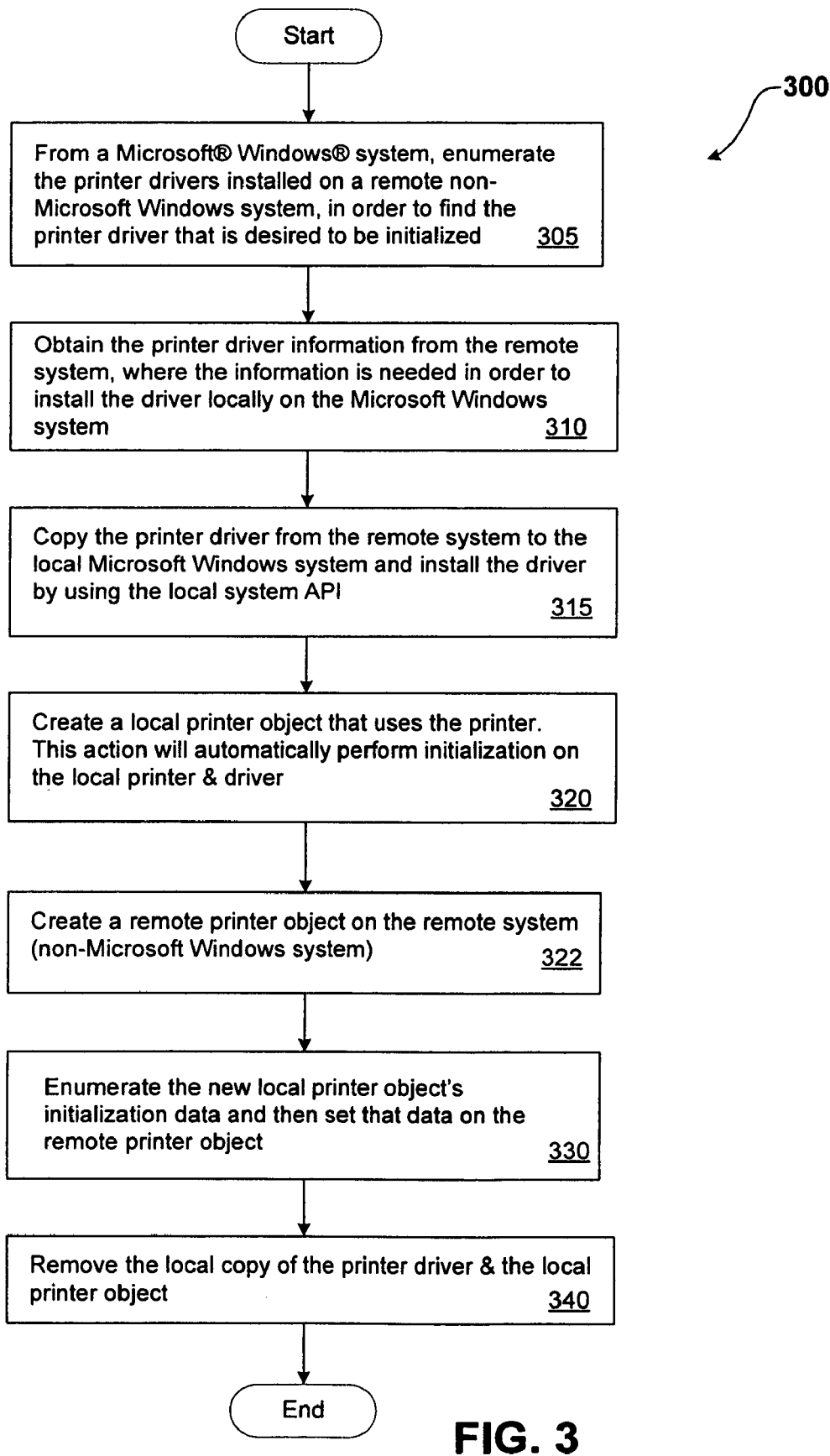
FIG. 3 is a flowchart of a method to initialize a printer driver for a non-Microsoft Windows system, where the printer driver is intended to run on a Microsoft Windows system, in accordance with another embodiment of the invention.

Reference is now made to both FIG. 1 and FIG. 3 to describe an example operation of another embodiment of the invention. FIG. 3 is a flowchart of a method 300 to initialize a printer driver 155 for a non-Microsoft Windows system 152, where the printer driver 155 is intended to run on a Microsoft Windows system 150, in accordance with another embodiment of the invention. The code 160 (FIG. 1) permits the various steps in the method 300 to be performed. Steps (305), (310), (315), (320), (330), and (340) were similarly described above for steps (205), (210), (215), (220), (230), and (240), except for the following. In step (322), a remote printer object is created on the remote system (non-Microsoft Windows system) 152 by an API call from the Microsoft Windows operating system 151 to the non-Microsoft Windows operating system 153. Step (330) then involves enumerating the initialization information 162 of the newly-created local printer object 161 in the administrative client computer 107, and that initialization information 162 is then set as cloned initialization information 162*a* in the remote printer object that was previously created in step (322).

In an alternative embodiment, the printer driver 155 can be initialized in software that does not involve the Microsoft Windows driver initialization process. The administrative client 107 would, therefore, include a local system 150 with printer driver initialization software that can initialize the printer driver 155 outside the Microsoft Windows driver initialization process.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method for printer driver initialization, the method comprising:
   copying a selected printer driver from a remote system to a local system wherein the remote system comprises a first type of operating system and wherein the local system comprises a second type of operating system, and installing the printer driver on the local system;
   prior to initializing the printer driver on the local system, creating a local printer object in the local system;
   initializing the printer driver on the local system and generating initialization information for the initialized printer driver, wherein the initialization information is associated with a first printer device;
   prior to cloning the initialization information, creating a temporary remote printer object on the remote system;
   cloning the initialization information on the local system in order to generate a cloned initialization information, and storing the cloned initialization information on the remote system; and
   binding the cloned initialization information to the selected printer driver in the remote system, wherein the cloned initialization information in the remote system is used by a second printer device that uses the selected printer driver in the remote system.

2. The method of claim 1, further comprising:
   prior to copying the selected printer driver to the local system, enumerating all printer drivers in the remote system.

3. The method of claim 1, further comprising:
   prior to copying the selected printer driver to the local system, obtaining printer driver information of the selected printer driver in the remote system.

4. The method of claim 1, further comprising:
   after creating the temporary printer object on the remote system, enumerating the initialization information in the local printer object and setting the cloned initialization information on the temporary remote printer object.

5. The method of claim 1, further comprising:
   prior to cloning the initialization information, creating a remote printer object on the remote system.

6. The method of claim 5, further comprising:
   after creating the printer object on the remote system, enumerating the initialization information in the local printer object and setting the cloned initialization information on the remote printer object.

7. The method of claim 1, wherein the act binding the cloned initialization information comprises:
   using a special operation on a temporary remote printer object to transfer the cloned initialization information to a data store and to bind the cloned initialization information to the selected printer driver by name of the selected printer driver.

8. The method of claim 1, further comprising:
   removing the printer driver and a local printer object from the local system.

9. The method of claim 1, further comprising:
   removing a temporary remote printer object from the remote system.

10. An article of manufacture, comprising:
    a machine-readable medium having stored thereon instructions to:
    copy a selected printer driver from a remote system to a local system wherein the remote system comprises a first type of operating system and wherein the local system comprises a second type of operating system, and installing the printer driver on the local system;
    create a local printer object in the local system, prior to initializing the printer driver on the local system;
    initialize the printer driver on the local system and generating initialization information for the initialized printer driver, wherein the initialization information is associated with a first printer device;
    create a temporary remote printer object on the remote system, prior to cloning the initialization information;
    clone the initialization information on the local system in order to generate a cloned initialization information, and storing the cloned initialization information on the remote system; and
    bind the cloned initialization information to the selected printer driver in the remote system, wherein the cloned initialization information in the remote system is used by a second printer device that uses the selected printer driver in the remote system.

11. A network printing system for printer driver initialization, the network printing system comprising:
    a network;
    an administrative client computer that is connected to the network;
    a server connected to the network, wherein the server comprises a remote system;
    wherein the administrative client computer comprises a local system including:
    means for copying a selected printer driver from a the remote system in the server to the local system in the administrative client computer, wherein the remote system comprises a first type of operating system and wherein the local system comprises a second type of operating system, and installing the printer driver on the local system;
    means for creating a local printer object in the local system, prior to initializing the printer driver on the local system;
    means for initializing the printer driver on the local system and generating initialization information for the initialized printer driver;
    means for creating a temporary remote printer object on the remote system, prior to cloning the initialization information; and
    means for cloning the initialization information on the local system in order to generate a cloned initialization information; and
    wherein the remote system in the server includes:
    means for storing the cloned initialization information on the remote system; and
    means for binding the cloned initialization information to the selected printer driver in the remote system, wherein the cloned initialization information in the remote system is used by a second printer device that uses the selected printer driver in the remote system.

12. An apparatus for printer driver initialization, the apparatus comprising:
a remote printer driver initialization code stored in a client computer, the code configured to permit a copy of a selected printer driver from a remote system to a local system wherein the remote system comprises a first type of operating system and wherein the local system comprises a second type of operating system, and install the printer driver on the local system; and wherein the code is configured to create a local printer object in the local system prior to initializing the printer driver on the local system and to permit initialization of the printer driver on the local system and generation of the initialization information for the initialized printer driver, wherein the initialization information is associated with a first printer device; and wherein the code is configured to create a temporary remote printer object on the remote system prior to cloning the initialization information and to clone the initialization information on the client computer in order to generate a cloned initialization information, and store the cloned initialization information on the remote system; and
wherein the remote system binds the cloned initialization information to the selected printer driver in the remote system, wherein the cloned initialization information in the remote system is used by a second printer device that uses the selected printer driver in the remote system.

13. The apparatus of claim 12, wherein the code permits enumeration of all printer drivers in the remote system, prior to copying the selected printer driver to the local system.

14. The apparatus of claim 12, wherein the code permits obtaining printer driver information of the selected printer driver in the remote system, prior to copying the selected printer driver to the local system.

15. The apparatus of claim 12, wherein the code permits enumeration of the initialization information in the local printer object and setting of the cloned initialization information on the temporary remote printer object, after creating the temporary printer object on the remote system.

16. The apparatus of claim 12, wherein the code permits creation of a remote printer object on the remote system, prior to cloning the initialization information.

17. The apparatus of claim 16, wherein the code permits enumeration of the initialization information in the local printer object and setting the cloned initialization information on the remote printer object, after creating the remote printer object on the remote system.

18. The apparatus of claim 12, wherein the code permits using a special operation on a temporary remote printer object to transfer the cloned initialization information to a data store and to bind the cloned initialization information to the selected printer driver by name of the selected printer driver.

19. The apparatus of claim 12, wherein the code permits removal the printer driver and a local printer object from the local system.

20. The apparatus of claim 12, wherein the code permits removal of a temporary remote printer object from the remote system.

* * * * *

UNITED STATES PATENT AND TRADEMARK OFFICE
CERTIFICATE OF CORRECTION

PATENT NO. : 7,350,214 B2  Page 1 of 1
APPLICATION NO. : 10/640494
DATED : March 25, 2008
INVENTOR(S) : Brett Williams et al.

It is certified that error appears in the above-identified patent and that said Letters Patent is hereby corrected as shown below:

In column 10, line 40, in Claim 11, after "from" delete "a".

Signed and Sealed this

Nineteenth Day of August, 2008

JON W. DUDAS
*Director of the United States Patent and Trademark Office*